United States Patent [19]

Bankeström et al.

[11] Patent Number: 5,685,068
[45] Date of Patent: Nov. 11, 1997

[54] METHOD FOR MOUNTING BEARINGS WITH TAPERED BORE AND BEARING CONSTRUCTED TO ACHIEVE DESIRED INTERNAL BEARING CLEARANCE

[75] Inventors: Jan Olof Bankeström; Sven Göthberg, both of Frölunda, Sweden

[73] Assignee: Aktiebolaget SKF, Göteborg, Sweden

[21] Appl. No.: 493,091

[22] Filed: Jun. 21, 1995

[30] Foreign Application Priority Data

Jun. 21, 1994 [SE] Sweden .................. 9402174

[51] Int. Cl.⁶ ............................ B23P 15/00
[52] U.S. Cl. ............. 29/898.07; 29/434; 29/898.09; 29/407.08
[58] Field of Search ............... 29/898.07, 434, 29/464, 898.09, 407.08, 407.05, 407.01; 384/548

[56] References Cited

U.S. PATENT DOCUMENTS

| 4,054,999 | 10/1977 | Harbottle ............... 29/898.07 |
| 4,411,549 | 10/1983 | Sheppard . | |
| 4,796,474 | 1/1989 | Koenig ................ 73/862.65 |
| 4,893,948 | 1/1990 | Hoch . | |
| 5,222,817 | 6/1993 | Glazier . | |
| 5,386,630 | 2/1995 | Fox ................... 29/898.09 |
| 5,524,343 | 6/1996 | Blanks ................. 29/898.09 |

FOREIGN PATENT DOCUMENTS

| 0 534 537 | 3/1993 | European Pat. Off. . |
| 2 619 428 | 2/1989 | France . |
| 36 06 042 | 9/1986 | Germany . |
| 39 00 121 | 7/1990 | Germany . |
| WO92/19878 | 11/1992 | WIPO . |

*Primary Examiner*—Larry I. Schwartz
*Assistant Examiner*—Marc W. Butler
*Attorney, Agent, or Firm*—Burns, Doane, Swecker & Mathis, L.L.P.

[57] ABSTRACT

A method and device for establishing the correct amount that a bearing should be driven up a shaft involves measuring the strain on at least one of the side faces of the bearing ring through use of a sensor arranged on the side face of the bearing ring. The strain is measured while the bearing is being driven or moved along the shaft. The instantaneous bearing internal clearance reduction in the bearing can then be calculated from the measured instantaneous strain and the value for the known initial bearing internal clearance of the bearing.

9 Claims, 1 Drawing Sheet

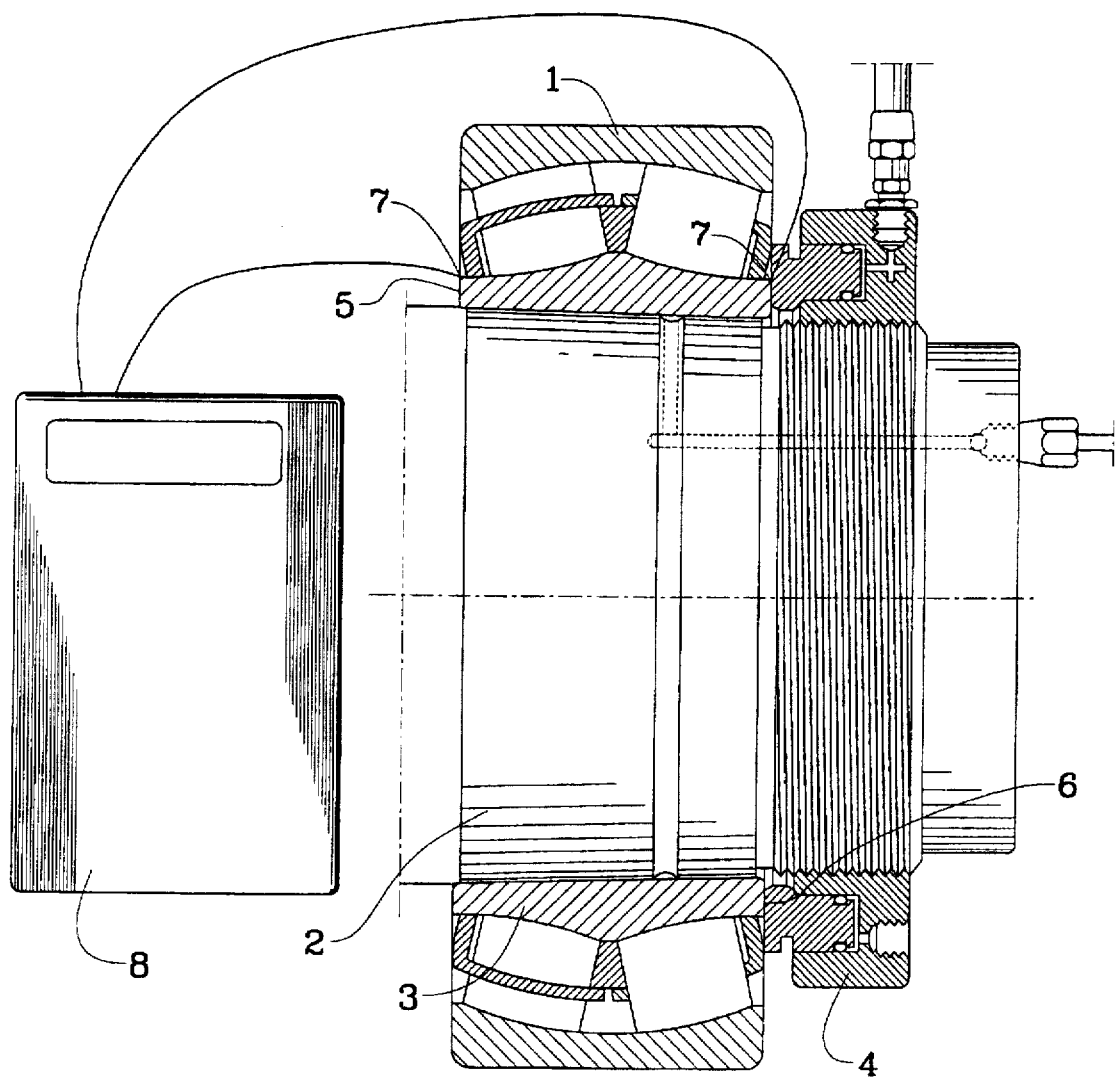

METHOD FOR MOUNTING BEARINGS WITH TAPERED BORE AND BEARING CONSTRUCTED TO ACHIEVE DESIRED INTERNAL BEARING CLEARANCE

FIELD OF THE INVENTION

The present invention relates to bearings, and more particularly to a method and a device for establishing, in connection with the mounting of a bearing, the correct amount that the bearing should be driven along the mounting element (e.g., shaft or adapter sleeve).

BACKGROUND OF THE INVENTION

Bearings with a taper bore are mounted on an elongated mounting element (e.g., a shaft or an adapter sleeve) with an interference fit. To achieve this interference fit, the inner race ring is preferably driven up on the mounting member by means of a hydraulic nut. As this occurs, the bearing internal clearance, i.e., the distance through which one bearing ring can be moved relative to the other in the radial direction (radial internal clearance) or in the axial direction (axial internal clearance). The reduction of the radial internal clearance of the bearing or the overall axial distance the inner ring is driven up on the taper seat is used as a measure of the size of the fit.

The bearing internal clearance after mounting is determined based on the initial bearing internal clearance of the bearing as manufactured and by the amount of press fit that the end user (mounter) applies for mounting the bearing on the mounting member. The bearing should be pushed hard enough or far enough along the mounting member to get a reasonable press fit, otherwise the bearing may become loose during operation and/or may destroy the shaft by wear or fretting corrosion. On the other hand, the bearing cannot be pushed too far since this may cause the bearing internal clearance to be too small for proper operation of the bearing. Thus, the bearing internal clearance is of significant importance for achieving successful and long life operation of a radial rolling element bearing.

The procedure for mounting bearings, particularly big bearings, involves first placing the new bearings in a washing process to thereby relieve the bearings of the anticorrosive layer they usually are provided with prior to delivery from the bearing manufacturer.

Thereupon the bearing is usually placed on a base and the radial internal clearance in the bearing is measured with the aid of thickness gauges. This measurement however is subjective and uncertain, which might lead to bearing malfunction.

When measuring the axial distance a bearing ring has been driven up on or along a shaft, it is of course important for obtaining a satisfactory result to know the starting position for the driving up operation. This might be difficult as the bearing in practice is positioned loosely on the shaft journal and is pressed up so that it has metallic contact around the entire bore in the bearing inner ring. This procedure is laborious as the bearings concerned are often heavy, and furthermore might have a certain out-of-roundness, which might also be true for the shaft journal. The uncertainty which therefore arises regarding the starting position for the driving up operation can amount to several millimeters and this means certainly that a satisfactory and reliable result is not obtained even if the length of the driving up is accurately measured with the aid of a dial indicator.

Measuring the bearing internal clearance reduction is a method which ought to be reliable. However experience has proven that such a method gives different results depending on the person performing the measurement so that different persons can obtain variations of 0.1 mm at measurement of the same clearance.

SUMMARY OF THE INVENTION

Therefore the purpose of the invention is to provide a method for establishing, in connection with the mounting of a bearing having a tapered bore on a mounting member, the correct amount the bearing should be driven up on the shaft to thereby facilitate the correct mounting of the bearing and eliminate the above mentioned problems. The present invention also involves a bearing constructed to achieve such results.

In accordance with one aspect of the invention, a method for establishing, in connection with the mounting of a bearing having a bearing ring on an elongated mounting member, the correct amount that the bearing should be driven along the shaft, includes placing a bearing having a bearing ring provided with a tapered bore on an elongated mounting member, wherein the bearing has associated therewith an initial bearing internal clearance, moving the bearing along the elongated mounting member, measuring strain at at least one of the side faces of the bearing ring while the bearing is being moved along the elongated mounting member, calculating the bearing internal clearance reduction for the bearing based on the strain measured and the initial bearing internal clearance.

In accordance with another aspect of the invention, a method for establishing the amount that a bearing mounted on an elongated mounting member and including a bearing ring having a tapered bore should be moved along an elongated mounting member, wherein the bearing has a known initial bearing internal clearance, includes measuring strain at at least one side face of the bearing ring while the bearing is being driven along the elongated mounting member to obtain a measured instantaneous strain, and calculating an instantaneous bearing internal clearance reduction in the bearing based on the measured instantaneous strain and the known initial bearing internal clearance.

According to a further aspect of the invention, a bearing for being mounted on an elongated mounting member and for establishing a correct amount that the bearing should be driven along the elongated mounting member includes a bearing ring having a tapered bore and oppositely positioned side faces, and strain measuring means positioned on at least one of the side faces of the bearing ring for measuring strain at said at least one side face and for outputting a signal representative of the strain to permit, in conjunction with a known initial bearing internal clearance of the bearing, determination of a bearing internal clearance reduction of the bearing.

BRIEF DESCRIPTION OF THE DRAWING FIGURE

The invention will be described in more detail below with reference to the accompanying drawing FIGURE which is a cross-sectional view of a spherical roller bearing.

DETAILED DESCRIPTION OF THE INVENTION

The drawing FIGURE shows a spherical roller bearing 1 which is driven up or along an elongated mounting member or tapered shaft journal 2. The bearing inner ring 3 has a tapered bore and the driving up is effected in the usual manner with the aid of a hydraulic nut 4. A sensor 7 is arranged on at least one side face 5, 6 of the inner ring 3, by means of which the strain of the inner ring can be established. The sensors can be common strain gauges, but it is also possible to use other types of sensors which can present in a simple and reliable manner the instantaneous strain of the inner ring.

The strain measured on one or both side faces 5, 6 of the bearing ring 3 by way of the sensor(s) 7 can then be converted into a very accurate estimation of the current clearance reduction in the bearing by means of a simple calculation. This calculation of the bearing internal clearance reduction can be estimated with good accuracy as the strain measured by the sensors in the circumferential direction multiplied by twice the radial distance between the center line of the supported shaft and the sensor. The accuracy in this calculation can be increased by substituting for the nominal radial distance between the center line of the supported shaft and the sensor a distance value which has been increased or decreased to correspond to the actual distance value when the local deformation of the ring is taken into account. This gives attention to the local deformation of the ring in dependence upon the axial position within the studied section of the bearing ring.

By connecting the sensor(s) 7 arranged on the side face of the inner ring 3 to a simple instrument 8 which performs the above mentioned calculation, it is possible to obtain a numerical value for the instantaneous internal clearance in the bearing directly on the display of the instrument. Thus, a continuous and safe indication is obtained of the actual amount the bearing ring is driven up on the shaft and of the fit, no matter if the starting position for the driving up operation is known or not.

The method according to the invention thus involves continuously measuring the strain in one or both side faces of the bearing inner ring and, through implementation of a simple calculation, continuously calculating a numerical value representing the instantaneous clearance reduction in the bearing.

In order to be able to establish the strain desired for or associated with a certain bearing internal clearance reduction, it is of course also necessary to know the original or initial internal clearance of the bearing. Since this original or initial internal clearance is already known for each individual bearing at the time of manufacture, it is simple to provide the bearing with a relevant marking, e.g. in form of an engraved numerical value, which represents or identifies the initial bearing internal clearance.

At measurement with the instrument during the time the ring is driven up, the current value for the bearing in question is fed into the instrument in every specific case.

By the steps referred to above, a bearing equipped in accordance with the invention will be more easy to mount in a correct manner than a bearing without such a device. The requirement of washing away corrosion protection from the bearings prior to mounting, and also the mounting itself, can be accomplished without problems with simple instruction and the instrument described above. Additionally, these activities can be performed by personnel that are not particularly well trained. Further, it is possible in a relatively easy and simple manner to avoid pushing the bearing too far up on the mounting member, thereby assuring that the bearing internal clearance is not too small for proper operation. At the same time, it is possible to ensure that the bearing is pushed for enough up the mounting member that the proper press fit is achieved, thereby preventing the bearing from becoming loose during operation.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A method for establishing, in connection with mounting a bearing having a bearing ring on an elongated mounting member, a correct amount that the bearing should be driven along the mounting member, comprising placing a bearing on an elongated mounting member, said bearing having associated therewith an initial bearing internal clearance, said bearing including a bearing ring which has a tapered bore and oppositely positioned side faces;

moving the bearing along the elongated mounting member;

measuring strain at at least one of the side faces of the bearing ring while the bearing is positioned on the elongated mounting member; and calculating a bearing internal clearance reduction for the bearing based on the strain measured and the initial bearing internal clearance, the bearing internal clearance reduction being used to determine the amount that the bearing should be driven along the mounting member.

2. The method according to claim 1, wherein said step of measuring strain includes measuring strain through use of a sensor positioned at at least one of the side faces of the bearing ring.

3. The method according to claim 1, wherein said step of measuring strain includes measuring strain through use of a strain gauge.

4. The method according to claim 1, including the step of determining the initial bearing clearance of the bearing by reading a marking on the bearing that is indicative of the initial bearing internal clearance.

5. The method according to claim 1, wherein said step of measuring strain produces signals representative of the measured strain that are sent to a calculator, the calculator also being provided with a value representative of the initial bearing internal clearance, said step of calculating the clearance reduction being performed by said calculator.

6. The method according to claim 1, wherein said step of measuring strain includes continuously measuring the strain at at least one of the side faces of the bearing ring, and said step of calculating the bearing internal clearance reduction including continuously calculating the bearing internal clearance reduction to assess an instantaneous bearing internal clearance reduction in the bearing.

7. A method for establishing an amount that a bearing mounted on an elongated mounting member and including a bearing ring having a tapered bore should be moved along the elongated mounting member, wherein the bearing has a known initial bearing internal clearance, comprising measuring strain at at least one side face of the bearing ring while the bearing is being driven along the elongated mounting member to obtain a measured instantaneous strain, and calculating an instantaneous bearing internal clearance reduction in the bearing based on the measured instantaneous strain and the known initial bearing internal clearance, the instantaneous bearing internal clearance reduction being used to establish the amount that the bearing should be moved along the elongated mounting member.

8. The method according to claim 7, wherein said step of measuring strain includes continuously measuring the strain by way of a strain gauge disposed at at least one side face of the bearing ring.

9. The method according to claim 7, wherein said step of measuring strain produces signals representative of the instantaneous strain, and including sending said signals to a calculator which is also provided with a value representative of the known initial bearing internal clearance, said calculator calculating the bearing internal clearance reduction based on said signals and said value.

* * * * *